(12) United States Patent
Eldic (10) Patent No.: US 11,082,802 B2
(45) Date of Patent: Aug. 3, 2021

(54) APPLICATION OF DATA STRUCTURES TO GEO-FENCING APPLICATIONS

(71) Applicant: BLUEDOT INNOVATION PTY LTD, East Melbourne (AU)

(72) Inventor: Filip Eldic, East Melbourne (AU)

(73) Assignee: BLUEDOT INNOVATION PTY LTD., East Melbourne (AU)

( * ) Notice: Subject to any disclaimer, the term of this patent is extended or adjusted under 35 U.S.C. 154(b) by 0 days.

(21) Appl. No.: 16/078,619

(22) PCT Filed: Mar. 16, 2017

(86) PCT No.: PCT/AU2017/000065
§ 371 (c)(1),
(2) Date: Aug. 21, 2018

(87) PCT Pub. No.: WO2017/173476
PCT Pub. Date: Oct. 12, 2017

(65) Prior Publication Data
US 2019/0045324 A1 Feb. 7, 2019

(30) Foreign Application Priority Data
Apr. 7, 2016 (AU) .............................. 2016901291

(51) Int. Cl.
*H04W 24/00* (2009.01)
*H04W 4/029* (2018.01)
(Continued)

(52) U.S. Cl.
CPC .............. *H04W 4/029* (2018.02); *G01S 1/00* (2013.01); *G06F 16/29* (2019.01); *H04W 4/021* (2013.01);
(Continued)

(58) Field of Classification Search
CPC ............ H04L 29/08657; H04W 4/029; H04W 64/00; H04W 4/021; H04W 64/003
See application file for complete search history.

(56) References Cited

U.S. PATENT DOCUMENTS 9,215,560 B1 * 12/2015 Jernigan ................ H04W 4/021
9,628,951 B1 * 4/2017 Kolavennu .......... H04W 4/029
(Continued)

OTHER PUBLICATIONS

PCT International Search Report and Written Opinion, PCT Application No. PCT/AU2017/000065, dated May 25, 2017, 11 pages.
(Continued)

*Primary Examiner* — Shantell L Heiber
(74) *Attorney, Agent, or Firm* — Fenwick & West LLP (57) ABSTRACT

In the field of mobile and user of the mobile location determination, geo-fences are used to identify areas and regions of commercial, safety and convenience to user of the mobile computer device. The methods disclosed reduce the central processor unit cycles of the mobile computer device and thus the power drain caused by high numbers of calculations required to determine the location of the mobile computer device relative to one or more complex shaped geo-fences by minimising the number of positioning calculations that the mobile device needs to perform. For location updates required by the mobile computer device, the method applies data structures to a deconstructed geo-fence prior to distance calculations for use by a geo-fencing application running on the mobile computer device.

18 Claims, 9 Drawing Sheets

(51) Int. Cl.
    *H04W 52/02*     (2009.01)
    *G01S 1/00*     (2006.01)
    *H04W 4/021*     (2018.01)
    *G06F 16/29*     (2019.01)
    *H04W 64/00*     (2009.01)

(52) U.S. Cl.
    CPC ..... *H04W 52/0254* (2013.01); *H04W 64/003* (2013.01); *Y02D 30/70* (2020.08)

(56) References Cited

U.S. PATENT DOCUMENTS

| | | |
|---|---|---|
| 2009/0044246 A1 | 2/2009 | Sheehan et al. |
| 2012/0115512 A1 | 5/2012 | Grainger et al. |
| 2013/0093627 A1 | 4/2013 | Cosman |
| 2014/0213298 A1* | 7/2014 | Marti ............... G01S 5/0252 455/456.3 |
| 2014/0232570 A1 | 8/2014 | Skinder et al. |
| 2014/0232593 A1 | 8/2014 | Varoglu |
| 2014/0274154 A1* | 9/2014 | Rana ............... G06F 16/21 455/456.3 |
| 2015/0271638 A1 | 9/2015 | Menayas et al. |
| 2016/0165393 A1* | 6/2016 | Pang ............... H04W 4/021 455/456.1 |
| 2017/0241660 A1* | 8/2017 | Sekar ............... F24F 11/30 |

OTHER PUBLICATIONS

Loyola, L. et al., "Extending Battery Lifetime of Mobile Devices with Geofence Capabilities on Dynamic-Speed Urban Environments," MobiGIS '13, Proceedings of the Second ACM SIGSPATIAL International Workshop on Mobile Geographic Information Systems, Orlando, Florida, Nov. 5, 2013, pp. 51-58 [Online], [retrieved on from internet on May 16, 2017] <URL:http://dl.acm.org/citation.cfm?id=2534193>.

Extended European Search Report, European Application No. 17778460.0, dated Aug. 22, 2019, 9 pages.

* cited by examiner

Figure 1

$$dlon = lon2 - lon1$$
$$dlat = lat2 - lat1$$
$$a = (\sin(dlat/2))^2 + \cos(lat1) * \cos(lat2) * (\sin(dlon/2))^2$$
$$c = 2 * \arcsin(\min(1, \sqrt{a}))$$
$$\textbf{distance = (Earth Radius) * c}$$

PRIOR ART

*Figure 4*

PRIOR ART

Figure 14

APPLICATION OF DATA STRUCTURES TO GEO-FENCING APPLICATIONS

CROSS REFERENCE TO RELATED APPLICATIONS

This application is a 35 U.S.C. 371 national stage filing of International Application No. PCT/AU2017/000065, filed on Mar. 16, 2007 which claims the benefit of Australian Patent Application No. 2016901291 filed on Apr. 7, 2016, the disclosures of which are incorporated herein by reference.

FIELD

The field of the disclosure in this document is geo-fencing in particular ways to calculate the relative distance of a location from a geo-fence and associated central processing unit cycles involved in such calculations.

BACKGROUND

Geo-fencing applications are required to use whatever computational power at its disposal to determine the position within a common datum, e.g. typically a mobile computing device, such as a mobile phone. On that mobile computing device, one or more location-dependent applications could be running all of which use the considerable computing power of the device to determine whether that device is at a predefined location, crossed a geo-line or is external or internal to a predetermined geo-fenced zone. The applications also need to report entrance, and exit events of the mobile device entering or exiting a geo-fenced area and these use similar computational power and are based on location determination as well.

Mechanisms of establishing the location of such a device commonly include cell tower (phone system) triangulation, Wi-Fi triangulation, applications of satellite-based navigation such as GPS, inertial navigation and Low Energy Bluetooth (BLE) signal based trilateration.

Geo-fencing applications increase the level of (typically) battery power used while establishing their location using one or more of the above mechanisms, with each mechanism having a different battery drain characteristic and accuracy of location determination, where generally the greater the accuracy, the greater the battery power usage (drain) and different applications using one or more of the mechanisms for establishing location at an appropriate time to suit the needs of the particular application.

However, battery drain will be incurred as a result of computational processes (Central Processing Unit (CPU) cycles) used by the central processing unit in the mobile computer device to calculate not only the location but as is sometimes the case the distance of the mobile device from a predetermined location (geo-fence). The distance calculation is useful for many reasons, including determining the location of the mobile device so as to display that location with reference to the geo-fence; determining if the distance from a geo-fence might trigger a particular action by the mobile computer device; determining the estimated distance to a geo-fence, to preload a message from a server that is to be displayed when the mobile device enters the geo-fence; etc.

Figure 1:
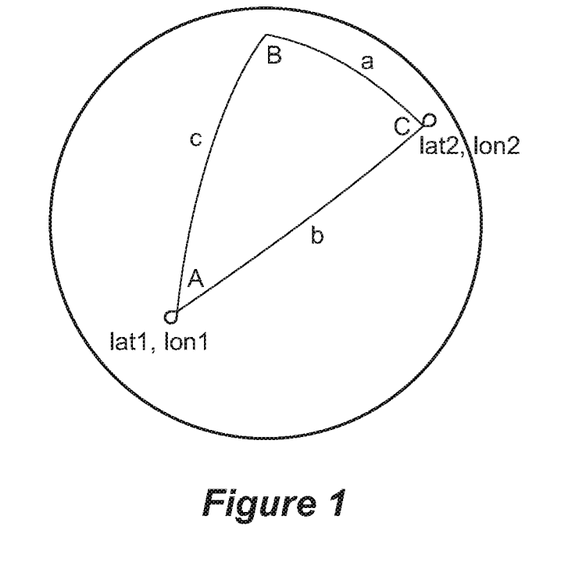
FIG. 1 depicts a spherical earth representation having a point to point distance displayed.
Figure 2:
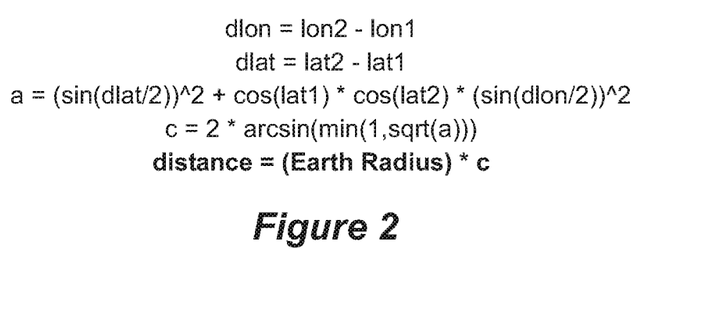
FIG. 2 depicts a sample set of formulae for calculating distance between two points on a sphere for small angles.

Referring to FIG. 1 this type of calculation is not trivial if relative accuracy is required, where one of the complicating factors is taking the curvature of the Earth into account, as illustrated by the shapes and lines depicted in FIG. 1. In one example, all calculations are performed using 3 dimensional rather than two-dimensional coordinates within the chosen datum, for example as depicted using the formula depicted in FIG. 2 which applies for small angles as would be the case in geo-fence applications where the geofenced is typically a local area not a country's surface on the Earth. Furthermore, because the curvature of the earth is not spherical but ellipsoidal (since the volume of the Earth is oblate, not spherical) the complexity of the calculation increases for long distances and each calculation is done with a selected datum. If the elevation is required, then a geoid model can be used so that some calculations will require an elevation component. Thus when location determination by the device is infrequent or when the geo-fenced area is a simple shape, the number and complexity of calculations performed is modest compared to frequent determinations and more complex geo-fence shapes regardless of the distances involved.

When trying to determine the location of the device in relation to a rectangular or square geo-fence arrayed on the surface of the earth, it is possible to calculate the distance of the device from the geo-fence by performing a simple point to line calculation (in 3 dimensional space) which determines the position of the device in relation to each side of the rectangle or square. This involves 4 calculations per geo-fence since, at each location update, a devices' CPU will only perform 4 calculations (still involving multiple cycles but very much less than otherwise would be the case). Another way of determining distance would be to choose to calculate the distance to all of the vertices of the geo-fenced area, which are readily available, since they can be used to define the geo-fenced area very easily, and assumes that the line segments of the rectangle or square are derived from them anyway.

Similarly, when trying to determine the location of a device in relation to a circular geofenced area, the computational method of calculating the distance between the device and a circle in three dimensional space is difficult to do, and it is much simpler to calculate the distance between the device from the centre of the circle, which is used in any event to create the circular zone and then subtract the radius of the circle from the distance calculation, rather than perform multiple calculations determining where the device is in reference to multiple points along the circumference of the circle or the closest portion of the circle.

When applying a similar logic to understanding where a device is in relation to a polygonal shape, the number of necessary calculations increases dramatically with the number of edges and corresponding vertices that the polygon has. With complex polygons containing thousands of edges and respective vertices, the number of calculations performed each time a device establishes its location will be significant.

To add to the complexity there can be a significant number of geo-fences in the vicinity of the device (some operating systems limit the number of potentially active geo-fences, and in most operating systems there is a limit), thus calculations for each active geo-fence is required so that the device can establish its location and relative position multiple times a second, and the number of calculations required each second grow and can then only be limited by limiting the number of geo-fences being used, many of which, if not presently in the future, will comprise polygonal shaped geo-fenced areas in 2- and 3-dimensions. Such shapes are not merely theoretical flights of fancy, but representative of real world commercial needs.

In an example of the calculation requirement:

Number of addressable edges for each geo-fence:
2000  (1)

Number of geo-fences in the vicinity of the device:
2000  (2)

Number of location updates per second: 4  (3)

Number of positioning calculations each second:
2000*2000*4=16,000,000  (4)

Figure 3:
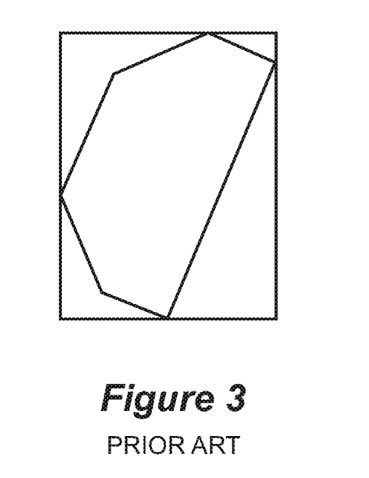
FIG. 3 depicts a prior art approach to simplifying the determination of distance of a mobile device from a polygonal geo-fence by surrounding the polygon with a minimum bounding box and using the box for distance calculations instead of the polygon.

To reduce the number of calculations, a common practice is to create a minimum bounding frame, typically a square or rectangular shape, which generally has 4 sides, that touches the polygon at a minimum of four locations, effectively replacing the polygon with a rectangular shape that is as small as possible but still contains within it, all geo-locations that comprise the polygon. Such a shape, as illustrated in FIG. 3, then simplifies the relative location calculations greatly by removing the first element in the equation—the number of addressable edges for each geo-fence from, in one example from 2000 to 4.

In this example, the number of positioning calculations each second becomes

Number of positioning calculations each second
2000*4=8000  (5)

Figure 4:
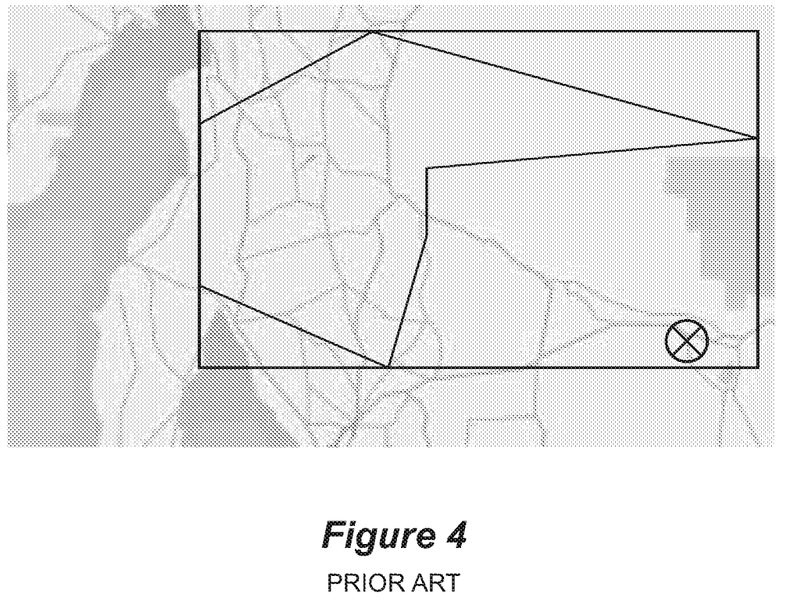
FIG. 4 depicts a complex polygonal geo-fence bounded by a prior art rectangular bounding frame over a geographic area showing road systems and geographic characteristics.

However, for many types of polygons, it is not realistic to employ the abovementioned technique—for instance in the case of a complex polygonal geo-fences particularly self-intersecting polygonal shapes. If there are great differences in distance between the outermost and inner most points of a polygon, when a device approaches the polygonal area, it is possible that the device is inside the minimal bounding frame (square), but not inside the complex polygonal geo-fence, as illustrated in FIG. 4.

In such a scenario the mobile device will recognize that it has entered the bounding frame (and may be required to perform particular actions when it has entered the polygonal geo-fence it represents), however due to its distance from the actual polygonal geo-fenced area, the action initiated may be unwanted, unnecessary, or in some cases potentially dangerous and considered a false trigger. Therefore, it is not practical to use a bounding frame approach for all polygonal geo-fences.

Therefore, the number of calculations required to determine position with reference to the actual geo-fence remains high and hence so also do the CPU cycles used by the device and consequent power drain associated with those cycles.

BRIEF DESCRIPTION OF ASPECTS OF THE DISCLOSURE

In an aspect, there is a method to reduce central processor unit cycles of mobile computer device by minimising the number of positioning calculations that the mobile computer device needs to perform in reference to any number of complex polygonal geo-fences at the point of each location update, the method comprising the steps of: applying data structures to a deconstructed geo-fence prior to distance calculations for use in a geo-fencing application, wherein an existing geo-fence, represented as geospatial data, to decomposes the geo-fence into a multiplicity of smaller geo-fences which each represent a portion of the existing geo-fence until the multiplicity of smaller geo-fences are representative of the existing geo-fence; and determining the position of the mobile computing device with reference to the closest smaller geo-fence.

In an aspect of the disclosure, wherein in step a) where each smaller geo-fence is deconstructed into a further number of yet smaller geo-fences when one of the smaller geo-fences intersects the boundary of the complex polygonal geofence, this step being repeated for each of the smaller geo-fences to a level of granularity that is sufficient to replace the complex polygonal geo-fence with a large number of smaller geo-fences whose combined shape mirrors the complex polygonal geo-fence.

In an aspect of the disclosure spatial indexing is used to identify one or more of the smaller geo-fences of the existing geo-fence.

In an aspect, the form of spatial indexing used is Quadtree data structure analysis to identify one or more of the smaller geo-fences of the existing geo-fence.

In an aspect of the disclosure, the stored geospatial data is representative of selected complex polygonal geo-fences and those that are decomposed are only those that are in the vicinity of the mobile device.

In an aspect of the disclosure, the predetermined data representative of the one or more geospatial data is required to represent the chosen geo-fence as a multitude of smaller geo-fences with a simpler geometry that when grouped, closely mirror the shape of the complex polygonal geo-fence and then applying the principles of Quadtree data structures on the subset of geo-fences until only the closest smaller geo-fence is located and using that smaller geo-fence for a positioning calculation.

A detailed description of one or more preferred embodiments is provided below along with accompanying figures that illustrate by way of example the implementation of those embodiments. The scope of the disclosure is limited only by the appended claims, and the disclosure encompasses numerous alternatives, modifications, and equivalents. For the purpose of example, numerous specific details are outlined in the following description to provide a thorough understanding of the presented implementations. The present disclosures may be practised according to the claims without some or all of these specific details. For the purpose of clarity, technical material that is known in the respective technical fields has not been described in detail so that the present disclosure is not unnecessarily obscured.

Although the embodiments are described in some detail for purposes of clarity of understanding, it will be apparent that certain changes and modifications may be practised within the scope of the appended claims. It should be noted that there are many alternative ways of implementing both the process and apparatus of the present embodiments. Accordingly, the present embodiments are to be considered as illustrative and not restrictive, and are not to be limited to the details given herein, but may be modified within the scope and equivalents of the appended claims.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgement or any form of suggestion that such background or prior art forms part of the common general knowledge.

Suggestions and descriptions of other embodiments may be included within the disclosure, but they may not be

DETAILED DESCRIPTION OF EMBODIMENTS

In order to reduce the number of distance calculations, within an interval, say per second that are needed to be performed when approaching one or more complex polygonal geo-fence/s, it is preferable to be able to determine the devices' location with respect to the closest point or part of the geo-fence, rather than the centroid of the complex polygonal geo-fence or bounding box which may not be representative of the nearness of the boundary of that complex shape. However with complex shapes, such as for example complex polygonal shapes including self-intersecting polygonal shapes, it is very difficult to isolate the closest point to the device, and in current methods, the device would still need to perform many calculations taking into account multiple points along each edge of the many-sided polygon.

Figure 5:
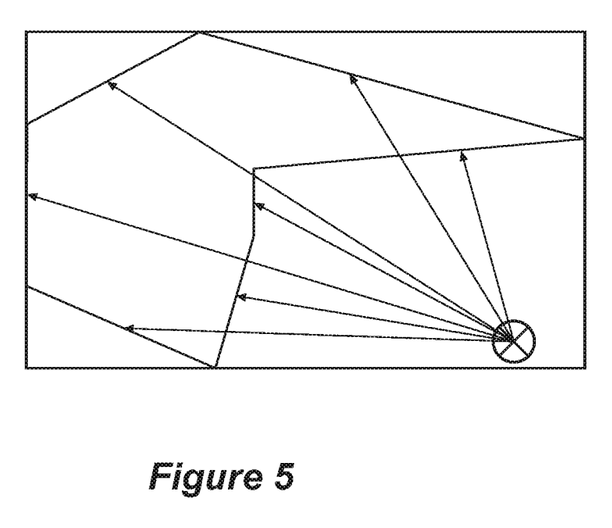
FIG. 5 depicts a complex polygonal geo-fence the same as FIG. 4 and a mobile computer device location X and illustrative of the calculations required to determine the distance of the device location from each side of the polygon.

FIG. 5 is illustrative of the calculations, which are made from the location marked by the X, to each side of a complex polygon there being 7 arrows each representing a calculation of the distance of the nominal device position, marked with an X from a respective side of the polygon. The number of sides of the illustrated polygon is small relative to the possibilities (as shown by way of comparison with the complex polygonal shape depicted in FIG. 6). Thus, a 2000 edged complex polygon (not shown) will still require the 2000 calculations.

To illustrate, an embodiment which addresses the above issue, an existing complex polygonal geo-fence is deconstructed into a large number of smaller, simpler geo-fence shapes, which when treated as a consolidated shape collectively overlays the shape of the complex polygon.

The first step, in this particular embodiment, is based on a starting boundary being the bounding box (the most Westerly, Northerly, Easterly and Southerly co-ordinates of the geo-fence can be used to create a virtual box) thus the entire complex polygonal geo-fence wholly lies within a very large shape referred to as the bounding box. Generally, it is a large rectangular shape however a square shape can also be dealt with regardless of the even greater redundancy of the area of the entire polygonal geo-fence zone lying within the very large shape. It is possible to create commands to be performed, by the CPU of the mobile computing device on the data representative of the very large shape, to decompose the spatial data so as to split, and group the very large shape into 4 distinct geographic zones (quadrants). The zones having the same shape and dimensions are illustrated in FIGS. 6, 7 and 8.

Clearly, 3-dimensional space is used. However, the geo-fence is segmented into quarters as if the geo-fence were arrayed on a spherical plane conforming to the local Earths' shape. Thus the original geo-fence and the newly subdivided geo-fences and all of the distance and positioning calculations are done in 3 dimensions. Keep in mind that all the geo-fences are curved not flat. The efficiency of such a subdivision will largely depend on the structures of the geospatial data that represents the complex polygonal geo-fence and the smaller geo-fences representative of that complex polygonal geo-fence.

Figure 6:
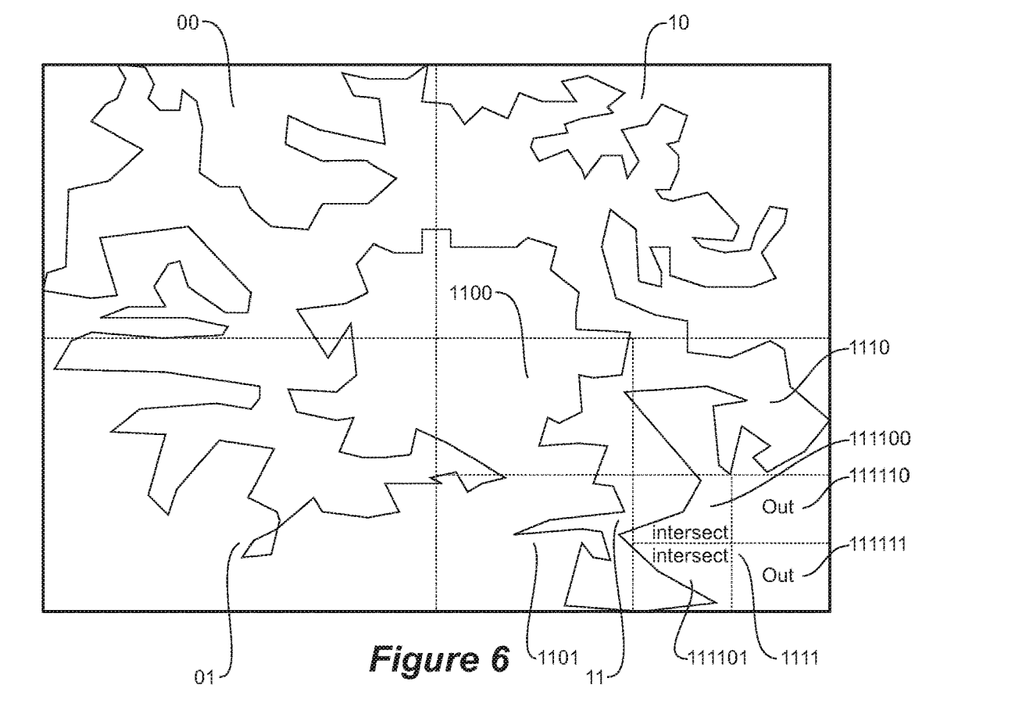
FIG. 6 depicts a more complex polygonal shape than depicted in FIGS. 4 and 5 partially overlayed with smaller rectangular shapes generated by a Quadtree approach.
Figure 7:
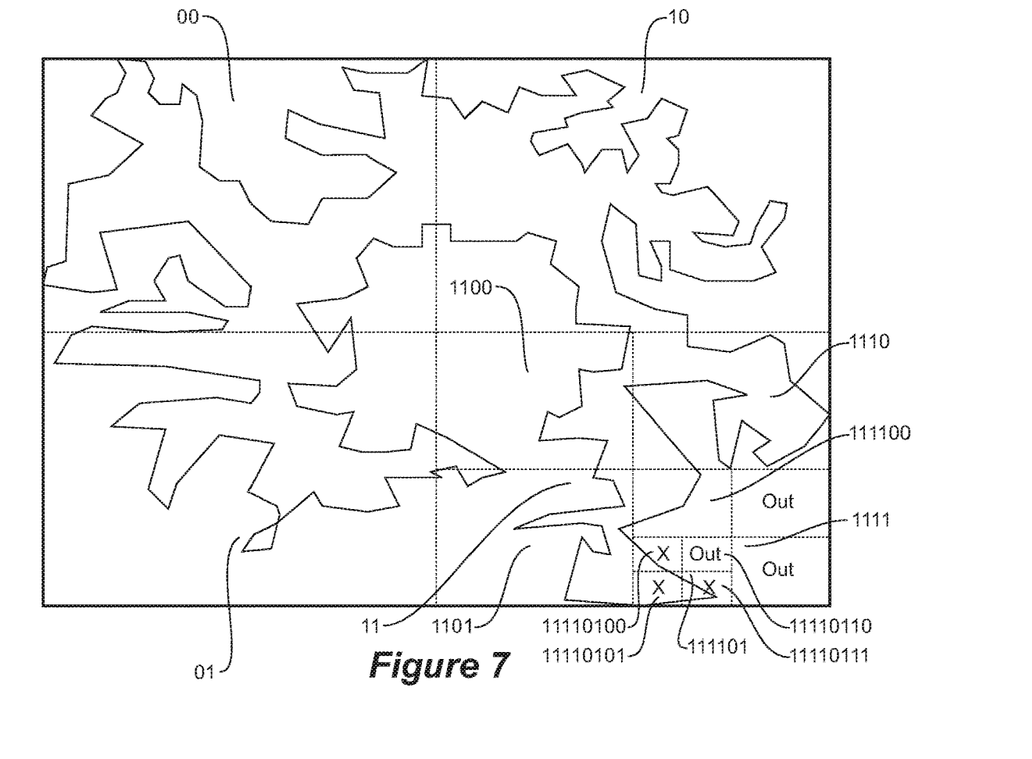
FIG. 7 depicts the complex polygonal shape of FIG. 6 further partially overlayed with smaller rectangular shapes further generated by the Quadtree approach.
Figure 8:
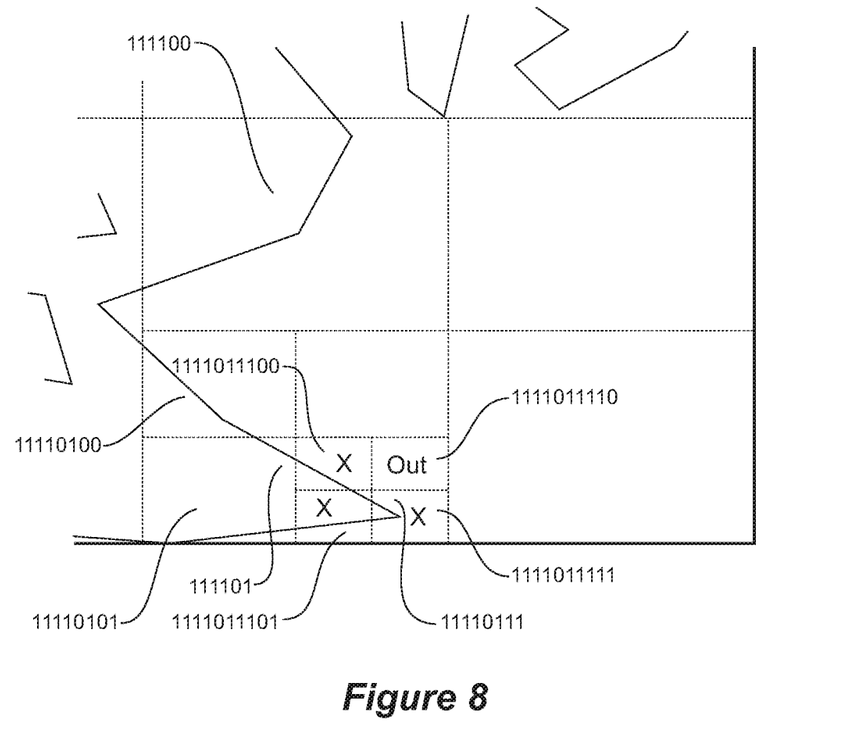
FIG. 8 depicts the complex polygonal shape of FIG. 6 yet further partially overlayed with smaller rectangular shapes further generated by the Quadtree Approach

FIGS. 6, 7 and 8 are illustrative of the decomposition (at least in part to illustrate the process) of the geo-fence boundary being bounded and then decomposed into multiple smaller regular polygons. The process is conducted multiple times to create a grid of data which represents multiple regular polygons (co-ordinates of which are part of the data) which each overlie the original complex polygon (represented best by a table of relevant data).

The bounding box 60 in FIG. 6 is divided it into quarters which is a simple mathematical process since the vertices of the bounding box are known and calculating the half way point of each boundary is a simple calculation which can be conducted purely in co-ordinate form. In one example, each quadrant can be identified by a digital code. Thus of the four quadrants, and for ease of description the terms top, bottom, left-hand and right-hand will be used, but they could also be substituted by the terms, North, South, West and East since this is geographically based environment and the latitude and longitude pairs (with horizontal values where applicable). Thus the top left-hand quadrant is 00, the top right-hand quadrant is 10, the bottom left-hand quadrant is 01, and the bottom right-hand quadrant is 11.

It can be noted that the bounding box has no size limitation and could traverse the Earth but is unlikely to be the case, however, the digital identification and transformation of those identifications into a geo-hash is still applicable.

If an entire formed quadrant lies within the polygon, which is also a simple determination, since each quadrant is merely a range of latitude and longitude and since the predetermined sides of the complex polygon are defined by latitude longitudinal pairs, a comparison of respective values will soon determine whether a side of the complex polygon will fall within or outside a quadrant.

If there does exist a portion of the polygon within a quadrant, then that quadrant is quartered again. Such as for example, the bottom right-hand quadrant 11 is shown as four quadrants, where in accord with the digital identification, the top left-hand quadrant is 1100, the top right-hand quadrant is 1110, the bottom left-hand quadrant is 1101, and the bottom right-hand quadrant is 1111. Since a portion of the complex polygon is still within each of those quadrants, then each of them is quartered, but for illustration, the 1111 quadrant is shown in FIG. 6 as being further quartered, into 111100, 111110, 111101 and 111111.

If an entire formed quadrant (111110 and 111111) lies outside (OUT) of the polygon, that quadrant is no longer subjected to quartering and effectively ignored.

If a formed quadrant (111101) is intersected by any one or more lines of the polygon that quadrant is quartered again to become 11111000, 11111010, 1111101 and 11111011 as depicted in FIG. 7. Where again it can be seen and accordingly determined that 11111010 be ignored (OUT).

The process is repeated over and over using each quadrant that was segmented and which does contain any portion of the polygon. FIG. 8 shows this process again where the quadrants again become identified by 1111011100, 1111011110, 1111011101 and 1111011111. Where yet again it can be seen and accordingly determined that 1111011101 be disregarded (OUT).

Figure 9:
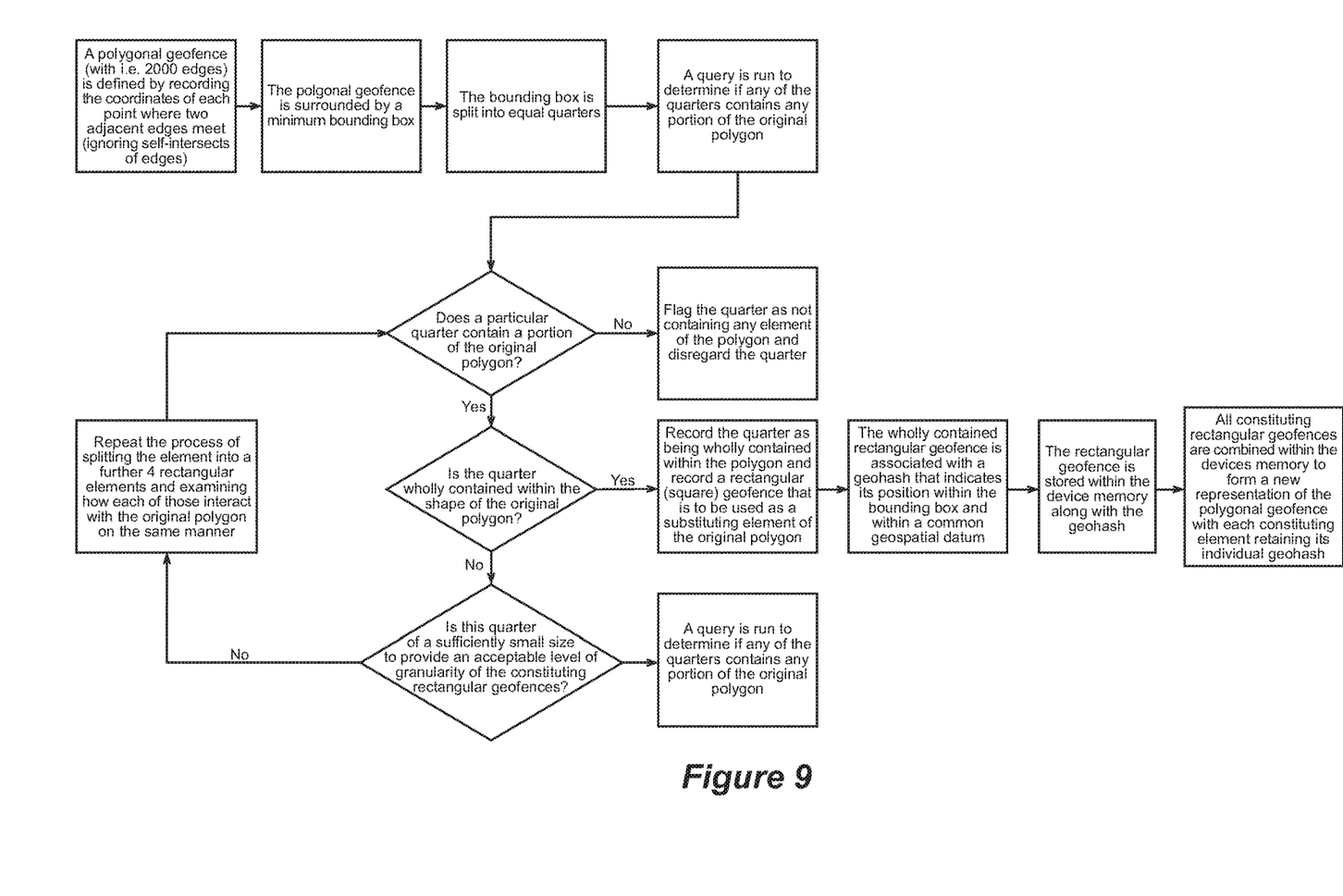
FIG. 9 depicts a flow diagram of the process of decomposing a geo-fence using Quadtree analysis.

FIG. 9 depicts a flow diagram of the repeated process of decomposing a geo-fence using Quadtree analysis and testing to determine whether the segmentation should continue or not.

Figure 10:
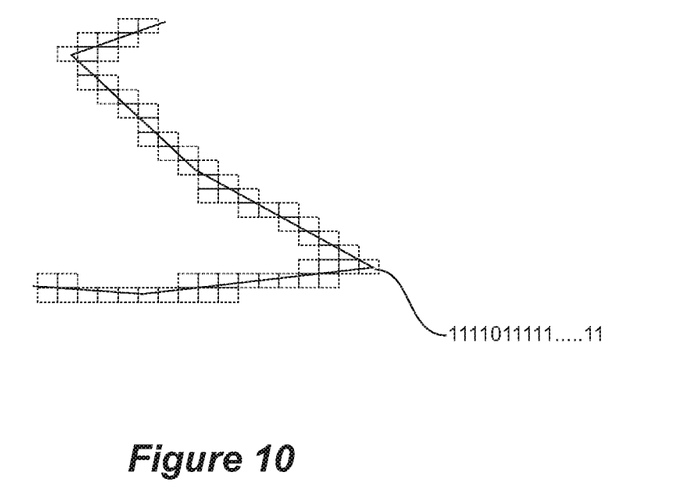
FIG. 10 depicts a small portion of the complex polygonal shape of FIG. 6 illustrating the granularity once the required or predetermined minimum smaller geo-fence size is reached.

FIG. 10 is a representation of the selected granularity of the final quartering, such that the small rectangular areas showed in the Figure, all include a portion of the complex polygonal shape and as such those small rectangular areas are representative of that complex polygonal shape (thus mirroring that shape to any required level of granularity). Since each of those areas have a digital identity then it becomes possible to sort, re-arrange and in particular analyse those digital identities using computational methods which are very CPU efficient.

A polygonal geo-fence (with e.g. 2000 edges) is defined by recording the coordinates of each point where two adjacent edges meet (ignoring self-intersecting edges).

The polygonal geo-offence is surrounded by a minimum bounding box, and the bounding box is split into equal quarters. A query is run to determine if any of the quarters contains any portion of the original polygon.

The question is posed does a particular quarter contain a portion of the original polygon?

If no—flag the quarter as not containing any element of the polygon and disregard that quarter.

If yes—is the quarter wholly contained within the shape of the regional polygon?

If yes—record the quarter as being wholly contained within the polygon and record a rectangular (including a square) geo-fence that is to be used as a substituting element of the original polygon. The wholly contained geo-fence is associated with a geo-hash that indicates its position within the bounding box and within a common geospatial datum. A geo-hash is a geocoding system comprised of a hierarchical spatial data structure which divides space (such as the surface of the earth) into grids, and the format of the reference for each grid is indicative of each grids relationship with other grid references, such as short Uniform Resource Locators (URLs) which uniquely identify positions on the Earth, so that referencing them in emails, forums, and websites and also in tables and databases, is more convenient. The e structure of geo-hashed data has two advantages. First, data indexed by geo-hash will have all points for a given rectangular area in contiguous slices (the number of slices depends on the precision required and the presence of geo-hash "fault lines"). This is especially useful in database systems where queries on a single index are much easier or faster than multiple-index queries. Second, this index structure can be used for a quick-and-dirty proximity search: the closest points are often among the closest geo-hashes. More about the format and use of geo-hashes is provided later in the specification. The rectangular geo-fence is stored within the device's memory along with the geo-hash. All overlapping constituting geo-fences are combined in the device's memory to form a new representation of the polygonal geo-fence with each element retaining its individual geo-hash.

If the answer to the question, is the quarter wholly contained within the shape of the original polygon, is no, then the next question is, is this quarter of this quarter, of sufficiently small size to provide an acceptable level of granularity of the constituting regular geo-fences?

If yes—stop segmenting this quarter further and record a rectangular (including a square) geo-fence that is to be used as a substituting element of the original polygon.

If no—repeat the process of splitting the element into a further four rectangular elements and examine how each of those interacts with the original polygon in the same manner, by posing the earlier question, does a particular quarter contain a portion of the original polygon?

There is, of course, a limit to how small the quadrant can or needs to become. In the embodiment described, there is a predetermined limit on the number of quadrants into which to break the polygon down. The way in which the limit is predetermined is determined before the beginning of the process, or on the fly, and can be dependent on many factors. In one example, the land areas of the first bounding box are determined, and if large, the size (area) of the smallest quadrant is large, compared to a smaller land area of the first bounding box, using smaller (comparatively) area (size) of the smallest quadrant.

In one alternative, the limit on the minimum quadrant size can be determined by exceeding the resolution of the GPS chipset used by the respective device, at least by several factors, i.e. if a segmented quadrant is 10 cm wide, and the best GPS accuracy is e.g. 5 meters, then there is no need to segment further.

The shape generated by this analysis consists of many quadrants (possibly many thousands), but it will not be the exact shape of the polygon, but it will be very close (dependant on the maximum resolution or number of quadrants generated).

FIG. 10 is an exploded view of a very small portion of the image of the complex polygon of FIGS. 6, 7 and 8 taken to the predetermined level of quartering. By way of illustrative example, the length of the digital identification of the rectangular geo-fence is likely to be very long, e.g. 1111011111 . . . 11 where there may be hundreds of digits involved (note the significant digits are the same as the last quadrant created in FIG. 8).

In an example, a complex polygonal geo-fence with e.g. 2000 edges and in an aspect it is disclosed that a complex polygonal geo-fence can be represented by a greater multitude (possibly tens of thousands) of regular shaped geo-fences there are then many times 2000 more edges to deal with and thus a need for the device to perform a significant number of calculations being many more than the 2000 edges approach described previously.

Thus, in an aspect, it is disclosed that it is possible to significantly reduce the number of calculations required by applying the principles of spatial indexing to the multitude of regular shaped geo-fences so as to identify the closest smaller regular shaped geo-fence of the complex polygonal geo-fence to the mobile device. Then the distance calculation can be performed on the identified smaller regular shaped geo-fences each with its index value (for example its own digital identification), and for multiple such complex polygonal geo-fences, there is only one closest smaller geo-fence per complex polygonal geo-fence to which the distance calculation needs to be made.

Figure 11:
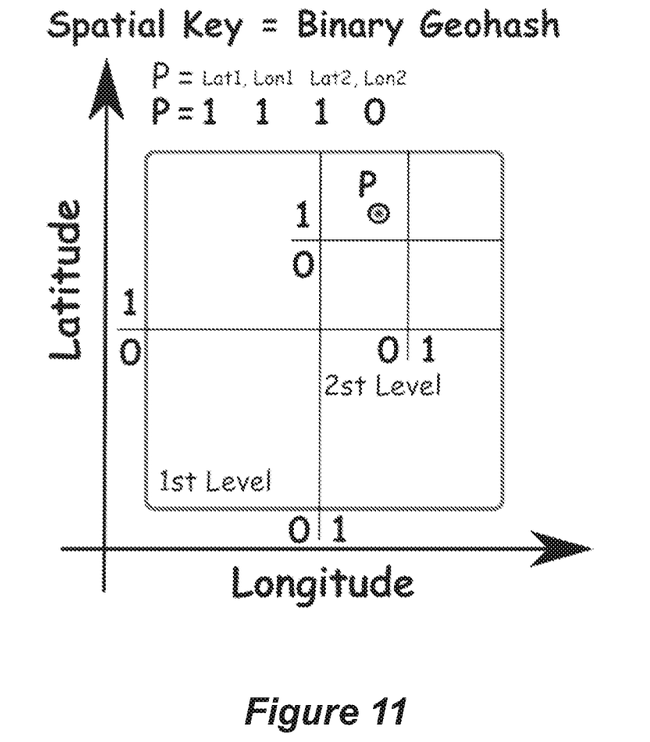
FIG. 11 depicts a spatial key indexing to geo-hash conversion example.

There are many spatial indexing methods, and recursive decomposition of a grid is the fundamental process used. One example of a very simple representation is provided in FIG. 11.

Quadtree analysis is the most used recursive decomposition method and therefore included as an embodiment, but that does not exclude other analysis techniques. The Quadtree approach provides a balanced tree structure of degree four. This hierarchical model where each node has four sons provides a distinct advantage to computational performance of the analysis because it exhibits a tree file structure which allows for compaction techniques and efficient file addressing schemes. The quadrant identification coding described by way of example illustrates this property. Further, in a geo-spatial environment, there is an ability to quickly deal with any geographic scale by logically and relatively quickly traversing the tree of data. Traversing a tree is a programmatic approach to allow a computer to handle very large digital representations in a very efficient manner. So by way of example, locating the geographically closest quadrant knowing the current location of a device, can be illustrated by moving from the closest largest quadrant 11, to the second largest closest quadrant 1111 and then eventually to 1111011111 . . . 11. This is a very simple example, as there are many additional ways to approach this requirement, recursive and non-recursive traversing methods, ways which depend on the way the original data is structured, etc.

A geo-hash is a representation of these long digital identifications which is explained later in this specification.

Many chosen approaches can be used to ultimately reduce (compared with the described prior art method) the CPU cycles devoted to the initial analysis of large amounts of spatial data. Yet further, recursive subdivision facilitates windowing of large spatial databases representative of, say multiple geo-fence zones, to relatively quickly identify those geo-fences that do not need to be analysed.

The Quadtree approach uses a general data model having a hierarchical data structure based on the principle of recursive decomposition using quadrants. An example of a data set representing the many regular shaped geo-fences is provided in FIG. 11, and in this example, the digital identification used is different to that used previously, but that does not change the approach or the methods used.

A method in which we can encode geographic coordinates to a geo-hash is as described previously.

In a further step, it is required to search the geo-hashed data. This is done through a simple recursive algorithm. In the above example San Francisco (see FIGS. 13 and 14), which is the city within which the complex geo-fence is located, could be in grid 000, a separate grid which overlays the complex polygonal geo-fence bounding box. If we are searching for the closest point, then those that process start with a 1 such as 100 or 101, are disregarded as the first geo-hash symbol indicated that they were not adjacent. We can also disregard the quadrants (ones) where the second character is not 0 (i.e. 010 or 011). That only leaves 001 as one quadrant that is close to the original location of San Francisco in grid 000.

1. When a location is indicated by a geo-hash string containing any number of characters, it is possible to disregard other geo-hashes (locations) where all the geo-hash characters up to the second to last character of the string are not identical to the original search item.

2. This eliminates a vast majority of the data immediately, leaving only a small number of adjacent grids by way of their geo-hash representation that needs to be searched for a match or close match.

There are many variants such as the use of rectangular quadrants based on the location of ordered points (sometimes referred to a point Quadtree); oct-tree branching; a three-dimensional Quadtree approach; gridded databases known as forest Quadtrees; recursive decomposition based on hexagonal tessellation or septrees but the smallest subdivision is pre-set; etc.

Thus in an embodiment, Quadtree data structures are applied to the new set of regular geo-fences to locate the closest smaller geo-fence which is representative of a portion of the entire complex polygon.

When applying the principles of Quadtree data structures, a mobile device is capable of storing, in a suitable format, the multitude of smaller geo-fences so that the process of Quadtree analysis can be most efficiently applied, to thus minimise the CPU cycles involved in the analysis of the stored data.

In the next step the CPU of the mobile device is to determine which quadrant or grouping of the geo-fences it is closest to, and thus being able to ignore the other 3 quadrants.

Figure 12:
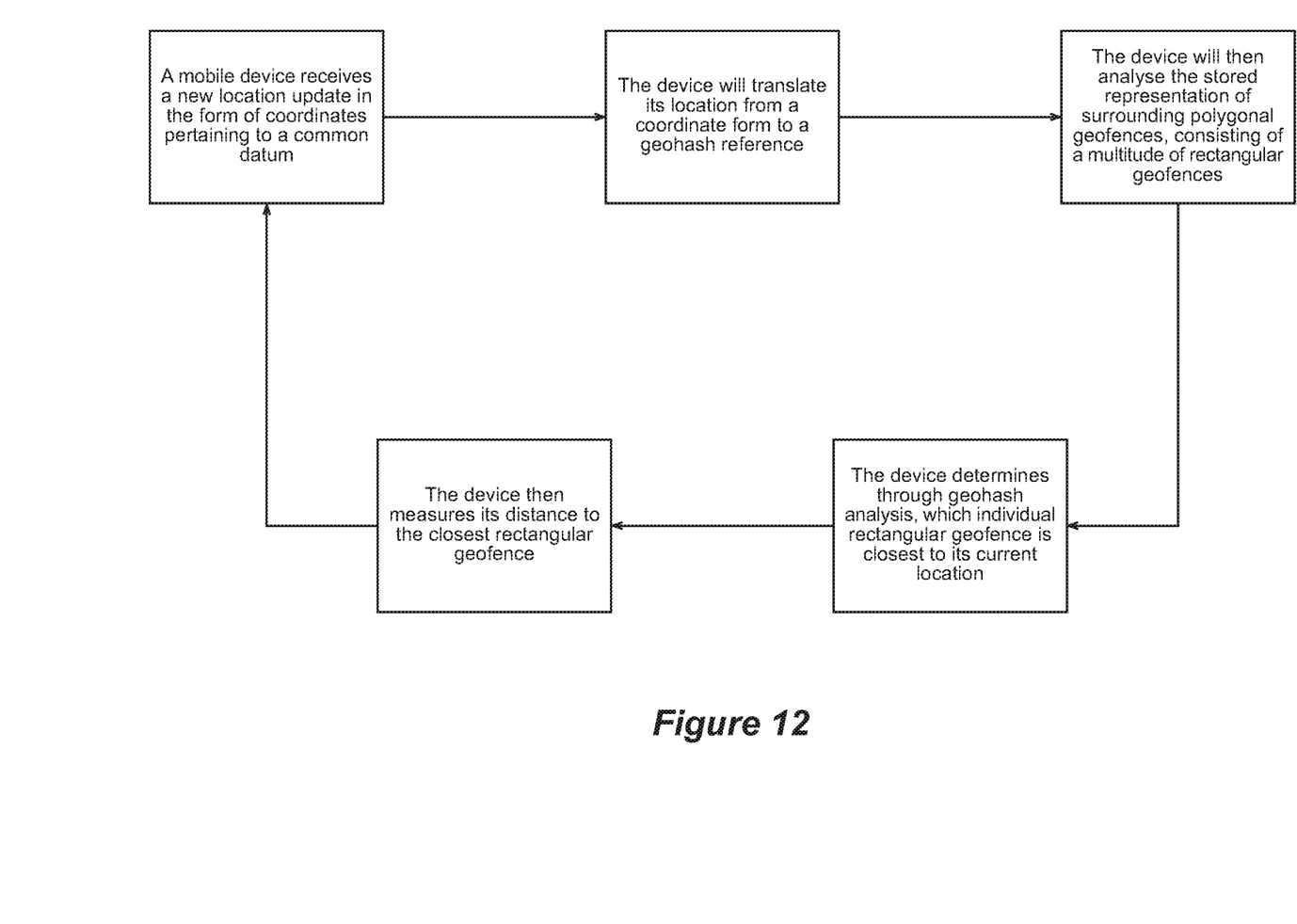
FIG. 12 depicts an example of the flow of steps relating to distance determination of a mobile computer device from a pre-resolved granular geo-fence region which lies on the boundary of a complex polygonal geo-fence.

FIG. 12 is a flow diagram of the process conducted by the mobile computer device.

The mobile device receives a new location update in the form of co-ordinates pertaining to a common datum.

The device will translate its location in a co-ordinate form to a geo-hash reference.

The device will then analyse the stored representation of the surrounding polygonal geo-fences consisting of a multitude of rectangular geo-fences.

The device determines through geo-hash analysis which individual rectangular geo-fence is closest to the current location.

The device and then measures its distance to the closest rectangular geo-fence.

Details regarding the determination of closeness can be dealt with in many ways without having to perform distance calculations, and by way of example only, geo-hash tables and sorting techniques can be used, depending on the format of the geospatial data.

There can be an iterative approach to the creation of a Quadtree-like data structure for storing polygonal geo-fence representations using, for example, a PR Quadtree and PM Quadtree some with more or less ability to store points, lines and regions depending on the granularity.

Thus once the closest such geo-fence to the device is known, then the mobile need only conduct the determination of the distance from that small geo-fence, since the decomposition of the complex polygonal geo-fence is already within the mobile device and traversing the geo-hashes is dealt with easily when required.

Clearly, the complex polygonal geo-fence data processing done to determine the relevant data is CPU intensive, but need only occur when needed at the time of downloading the geo-fence data. After that, every time the mobile computer device, say a mobile phone device, receives or generates with an on-board geolocation determination device as a location update, the mobile computer device need only determine which of the already granular (typically very small) rectangular or square geo-fence region is closest based on the geo-hash, and then the mobile computer device determines the distance to only that one small geo-fence, disregarding others. Furthermore, it is important to note that the type of processing involved is relatively simple as it involves grid/table look ups and possibly using indexed trees of geographic data and the like, but, mostly once that is performed the calculation of one distance. These ways of determining the distance from a geo-fence are much more CPU and power drain efficient than the prior art alternatives.

The computing power required is used for each of the potentially 1,000's of separate geo-fence zones that can be used by one or more applications on the mobile computing device, but, only once each time it is down loaded not for each and every geo-fence, each and every time since the nearest geo-hash associated with a granular geo-fence is a traversal problem, not a multiple distance calculation.

It should be understood that current use of circular geo-fenced zones is just the first invocation of geo-fence technology and as more business cases arise that requires, indeed demand, more complex geo-fenced areas, and such applications find more and more use, the number and complexity of geo-fence zones to deal with, will require new ways of dealing with the problems described.

By using the methods of the embodiments described, it is possible to ensure that the device performs a reduced or minimal number of positioning calculations at each requested location update, following the analysis described. There may also be times when the above-described analysis needs to be redone, but that will likely be much more infrequent than the distance calculations involved in meeting the needs of multiple applications (apps) all possibly using a different geo-fence zone or zones.

Thus, by way of illustration, there being 2000 geo-fences in the vicinity of a mobile device and each of them being a complex polygon with 2000 edges (where a bounding frame is not applied), and 4 location updates a second the device would have to perform 16,000,000 calculations per second.

When Quadtree data structures have been applied initially to all the geo-fences—the device will ignore the geofences that are not relevant to it (since that is a very quick recursive or even non-recursive tree search of the appropriately formatted data) and not perform positioning calculations against them until a closest granular geo-fence is determined to be relevant (match or closely matched).

The closest granular geo-fence is analysed by performing multiple rounds of Quadtree deconstruction on the grid/table representative of that geo-fence, until the device needs to take into account only a single smaller geo-fence (from the subset of geo-fences extracted from the larger polygonal geo-fence) but which still lies on the geo-fence boundary. This particular smaller geo-fence is determined to be closest to the mobile device at the time of the deconstruction, and thus usable to determine the distance of the mobile computer device from that single smaller geo-fence. The CPU usage in performing hierarchical analysis of the suitably formatted data is much more efficient than any prior approach.

A simple example uses a 3 character string containing only numbers. (that can only be 0, 1, 2, 3 as per Quadtree principles—there can only be one of 4 character values in each position, i.e.:

000, 001, 002, 003
010, 011, 012, 013
020, 021, 022, 023
030, 031, 032, 033
100, 101, 102, 103
110, 111, 112, 113
120, 121, 122, 123
130, 131, 132, 133
200, 201, 202, 203
210, 211, 212, 213
220, 221, 222, 223
230, 231, 232, 233
300, 301, 302, 303
310, 311, 312, 313
320, 321, 322, 323
330, 331, 332, 333

This is a very simple example, and if there was a need for further granularity of locations, it is simple to add one more character to the string:

0000, 0001, 0002, 0003
0010, 0011, 0012, 0013
0020, 0021, 0022, 0023
0030, 0031, 0032, 0033
0100, 0101, 0102, 0103

Thus, the number of distance calculations a device has to perform per second is reduced from 16,000,000 to 4 when using the four sides of the single smaller geo-fence.

Comparison Formulas:

$$2000*2000*4=16,000,000 \qquad (6)$$

$$1*1*4=4 \qquad (7)$$

Once a device determines that it has entered the smaller geo-fence (which lies on, the larger complex polygonal geo-fence boundary) or at or within a predetermined proximity to the same smaller geo-fence, the application will deal with the notification in accordance with the requirement of that application. In one example, having entered the initial larger polygonal geo-fence, there will an associated action, such as for example, provision of a notice to the user of the mobile device that they have entered a zone of interest to the user of the mobile device.

The mode in which the device stores geospatial reference data such as geo-fences, geo-spatial co-ordinates, lines defined by any means and the determined position of the mobile device, as well as the datum the device utilises should preferably be in a format that enables appropriate analysis using the approaches available.

Thus map data structures of which there are many forms form the basis for the display and analysis of cartographic data. Some examples are grid structure, Quadtree and tessellations plus device specific entity-by-entity structures all designed for use by computer devices. To facilitate the use of cartographic information, that information can be organized in a way to enable that data to be read to and be physically installed on to a storage medium, in a method of representation that allows a computer device to symbolize cartographic objects on maps and in the environment of the disclosure; the location of the mobile computer device; and geo-fence data with relative ease and within a reasonable length of time. Many of the functions of the computer programed to perform the embodiments disclosed consist of writing data into cartographic data structures and transforming the data between structures which replace complex and high-volume calculations, with the embodiments materially altering the time, CPU cycles and power consumed. Different structures suit different kinds of mapping and different sets of demands.

Also at each location update the device will have to work through the Quadtree data to sort out which data is relevant and which is not, however, the sorting process only involves a few steps and with correct data indexing procedures, the data sorting process is exponentially more power and CPU cycle use efficient compared to high numbers of positioning calculations.

Spatial indexing could involve the use of geo-hashes, and the manner of determining the closeness of a geographic location can be dealt with using a 1D comparison of the geo-hash since a common prefix indicates a common source and the number of common prefixes is indicative of the accuracy. Thus, for example, rlf93ch75x8y is close to rlf93ch75x8 as is rlf93ch75x but the area it represents only means that rlf93ch75x8y is within rlf93ch75x. Conversely ryf93dh35xya is far away and not relevant. There is still the problem of dealing with two locations which are physically close but are represented in the coding scheme as lying on different sides of a boundary, but there are algorithms which can determine the 8 surroundings grids of any one geo-hash.

Figure 13:
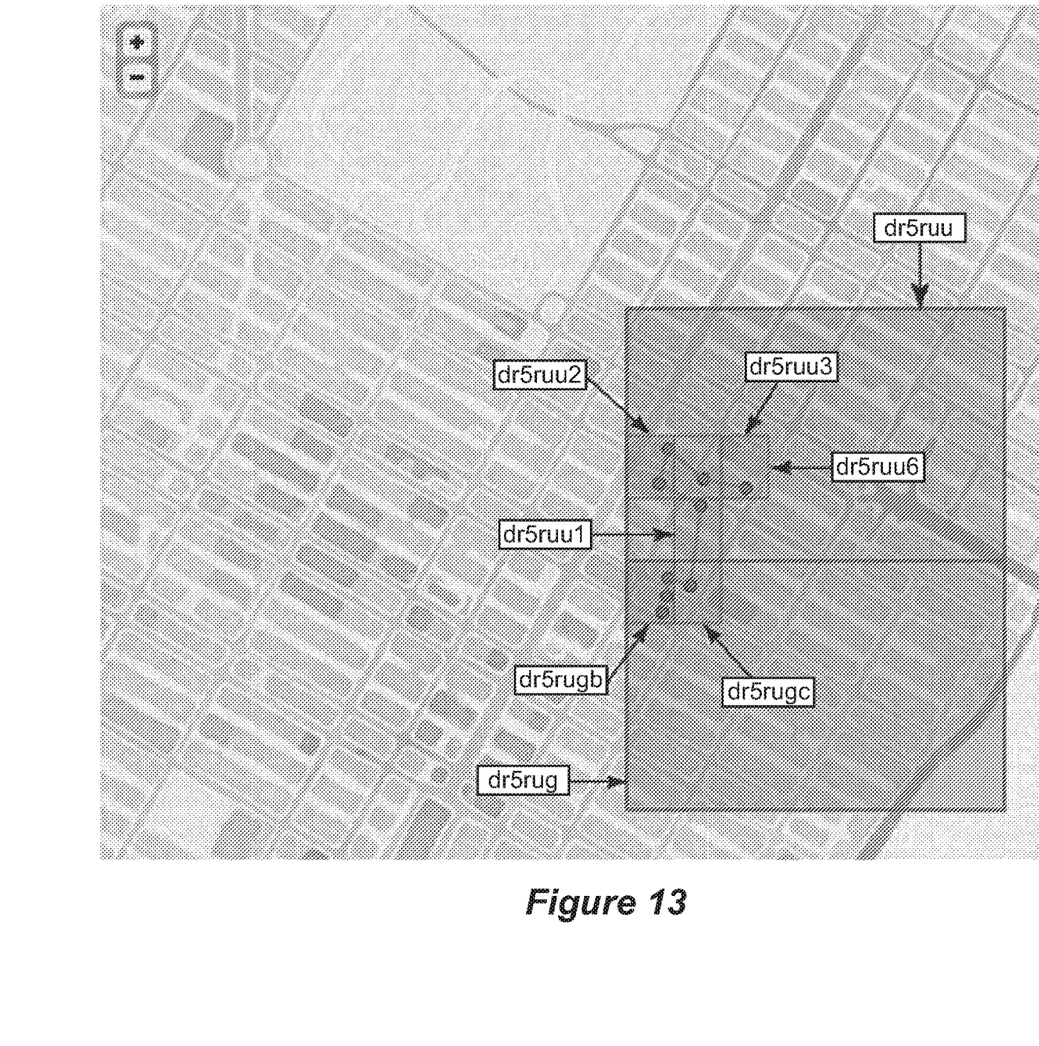
FIG. 13 depicts a representative of the use of geo-hashes to identify specific regions on a map with a particular representation.

Thus FIG. 13 is roughly representative of the use of geo-hashes to identify specific regions on a map with a particular representation, for example, dr5ruu2 is near dr5uu1 and dr5uu3, and all are within dr5uu, and a location (dot) is located in a respective region.

Figure 14:
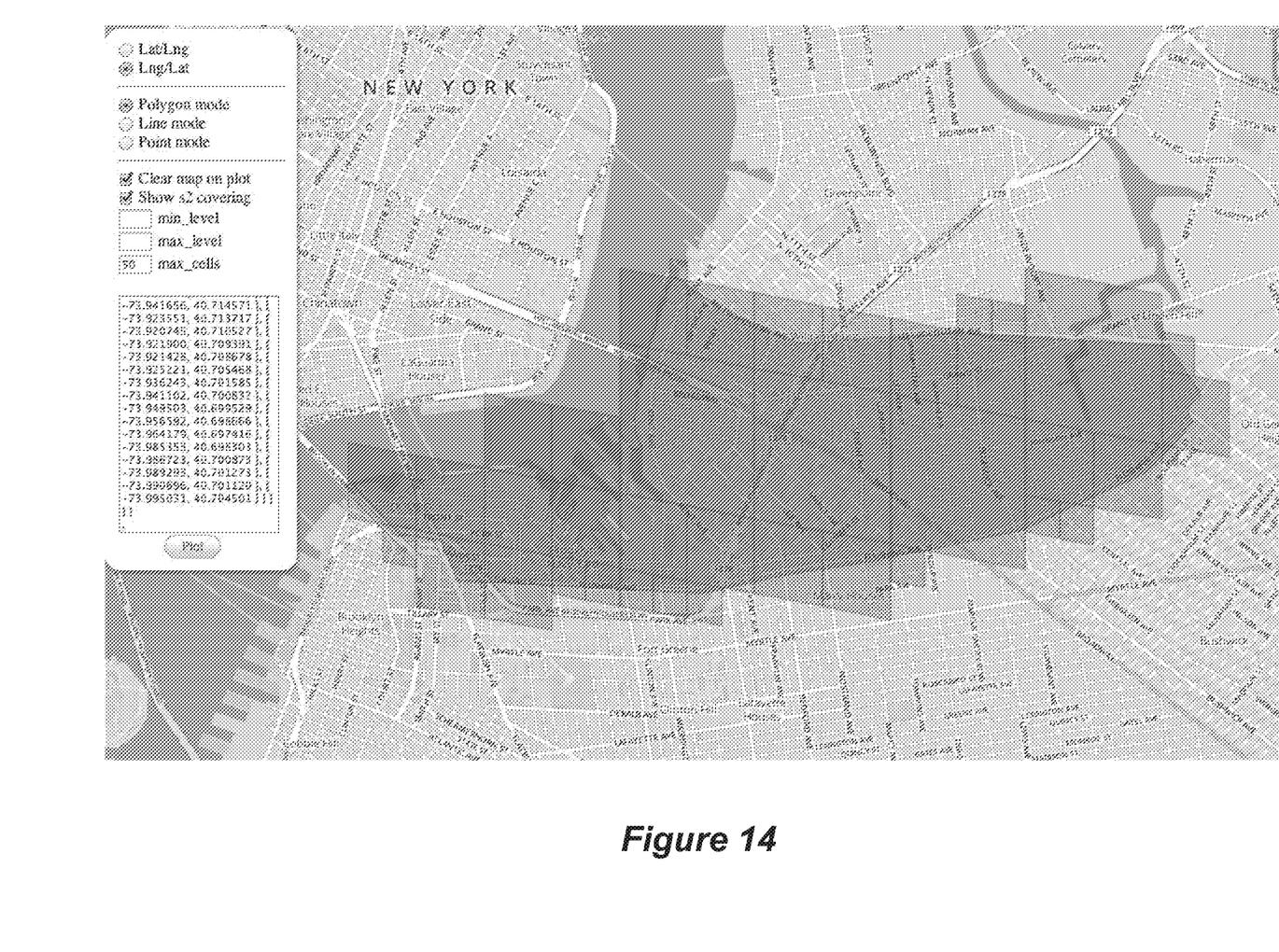
FIG. 14 an alternative representation of the creation of granular geo-fences to define a region (dark inner area) overlayed by parallelograms of the same shape formed in a grid pattern.

FIG. 14 depicts an alternative representation of the creation of granular geo-fences to define a region (dark inner area) overlayed by parallelograms of the same shape formed in a grid pattern. This illustrates that the granular geo-fenced areas that could be used to represent the complex larger geo-fence can be other than rectangles and squares.

The following descriptions provide details specific to an Android operating system and are provided for illustrative purposes only, and it will be within the skill set of those in this field to use the teachings to code for other operating systems. In any event, the code is used more to illustrate the functionality and detail associated with the steps associated with implementing the disclosure of this document.

The last known location of the device provides a handy base from which to start, ensuring that an app has a known location before starting any periodic location updates. Getting the Last Known Location is a step that is achieved by calling getLastLocation( ). The code can be created assuming that the app has already retrieved the last known location and stored it as a Location object in a global variable mCurrentLocation.

Apps that use location services must request location permissions. Typically they require fine location detection so that the app can get as precise a location as possible from the available location provider device/s. Requesting this permission with the uses-permission element in the app manifest, as is shown in the following example:

```
<manifest xmlns:android="http://schemas.android.com/apk/res/android"
  package="com.google.android.gms.location.sample.locationupdates" >
  <uses-permission android:name="android.permission.-
  ACCESS_FINE_LOCATION"/>
</manifest>
```

Before requesting location updates, the app must connect to location services and make a location request. Once a location request is in place the regular updates are generated by calling requestLocationUpdates( ). Do this in the onConnected( ) callback provided by a Google API Client, which is called when the client is ready.

Depending on the form of the request, a fused location provider either invokes the LocationListener.onLocationChanged( ) callback method and passes it a Location object, or issues a PendingIntent that contains the location in its extended data. The accuracy and frequency of the updates are affected by the location permissions requested and the options set in the location request object.

Getting the update using the LocationListener callback approach involves using the Call requestLocationUpdates( ), and passing it to the instance of the GoogleApiClient, the LocationRequest object, and a LocationListener and involved defining a startLocationUpdates( ) method, called from the onConnected( ) callback, as shown in the following code sample:

```
@Override
public void onConnected(Bundle connectionHint) {
    ...
    if (mRequestingLocationUpdates) {
        startLocationUpdates( );
    }
}
protected void startLocationUpdates( ) {
    LocationServices.FusedLocationApi.requestLocationUpdates(
        mGoogleApiClient, mLocationRequest, this);
}
```

Notice that the above code snippet refers to a boolean flag, mRequestingLocationUpdates, used to track whether the user has turned location updates on or off.

Calculating distance of the mobile computer device from the identified smaller regular shaped geo-fence is achieved by performing the type of calculations disclosed. It should be noted that if the number of distance calculations is reduced it is possible in some circumstances to use high complexity calculations which typically provide higher accuracy. This does not detract from the minimisation of CPU cycles since the alternative is performing many thousands of such calculations.

The invention claimed is:

1. A method to reduce central processor unit cycles of a mobile computing device by performing a number of positioning calculations in reference to any quantity of complex polygonal geo-fences at a time of a location update, the method comprising the steps of:
   prior to distance calculations for use in a geo-fencing application, deconstructing an existing geo-fence of a number of complex polygonal geo-fences represented as geospatial data, by decomposing the existing geo-fence into a multiplicity of smaller geo-fences, each representing a portion of the existing geo-fence, the multiplicity of smaller geo-fences represented using a hierarchical data structure;
   determining a position of the mobile computing device as a geo-hash reference;

traversing the hierarchical data structure to identify which smaller geo-fence of the multiplicity of smaller geo-fences that is closest to the determined position; and determining for each location update a distance of the position of the mobile computing device to the identified closest smaller geo-fence.

2. The method of claim 1 wherein each smaller geo-fence is deconstructed into a further number of yet smaller geo-fences when one of the smaller geo-fences intersects the boundary of the existing geo-fence, this step being repeated for each of the smaller geo-fences to a level of granularity that is sufficient to replace the existing geo-fence with a large number of smaller geo-fences whose combined shape mirrors that of the existing geo-fence.

3. The method of claim 1 wherein spatial indexing is used to identify the geo-fence of the multiplicity of smaller geo-fences that is closest to the determined position.

4. The method of claim 3 wherein the spatial indexing used is a Quadtree data structure analysis to identify one or more of the smaller geo-fences of the existing geo-fence.

5. The method of claim 1 wherein predetermined data representative of the geospatial data representing the existing geo-fence is used to determine the multiplicity of smaller geo-fences that, when grouped, mirror the shape of the existing geo-fence, and wherein principles of Quadtree data structures are applied on at least a subset of the multiplicity of smaller geo-fences until only the closest smaller geo-fence is located and used for a positioning calculation.

6. The method of claim 1, wherein the existing geo-fence of the number of complex polygonal geo-fences has a boundary corresponding to a self-intersecting polygonal shape.

7. The method of claim 1, wherein each of the multiplicity of smaller geo-fences is associated with a respective geo-hash representing a space within a grid that overlays an area that includes a bounding box of the existing geo-fence.

8. The method of claim 7, wherein the position of the mobile computing device is determined as a geo-hash reference, and wherein the hierarchical data structure is traversed to identify the closest smaller geo-fence based upon the geo-hash reference and geo-hashes associated with at least a subset of the multiplicity of smaller geo-fences.

9. A system for reducing central processor unit cycles of a mobile computing device by performing a number of positioning calculations in reference to any number of complex polygonal geo-fences at a time of a location update, comprising:
a geolocation determination device in the mobile computing device configured to determine a position of the mobile computing device as a geo-hash reference;
a data store storing a number of complex polygonal geo-fences represented as geospatial data;
at least one processor for determination of a relative position of the mobile computing device to an existing geo-fence of the number of complex polygonal geo-fences, configured to:
deconstruct the existing geo-fence by decomposing the existing geo-fence into a multiplicity of smaller geo-fences, each representing a portion of the existing geo-fence, the multiplicity of smaller geo-fences represented using a hierarchical data structure;
receive the position of the mobile computing device from the geolocation determination device;
traverse the hierarchical data structure to identify which smaller geo-fence of the multiplicity of smaller geo-fences that is closest to the determined position; and
determine for each location update a distance of the position of the mobile computing device to the identified closest smaller geo-fence.

10. The system of claim 9, wherein the at least one processor is configured to deconstruct each smaller geo-fence into a further number of yet smaller geo-fences when one of the smaller geo-fences intersects the boundary of the existing geo-fence, this step being repeated for each of the smaller geo-fences to a level of granularity that is sufficient to replace the existing geo-fence with a large number of smaller geo-fences whose combined shape mirrors that of the existing geo-fence.

11. The system of claim 9 wherein the at least one processor is further configured to use spatial indexing to identify the geo-fence of the multiplicity of smaller geo-fences that is closest to the determined position.

12. The system of claim 11 wherein the spatial indexing used is a Quadtree data structure analysis to identify one or more of the smaller geo-fences of the existing geo-fence.

13. The system of claim 9, wherein the at least one processor is further configured to use predetermined data representative of the geospatial data representing the existing geo-fence to determine the multiplicity of smaller geo-fences that, when grouped, mirror the shape of the existing geo-fence, and apply principles of Quadtree data structures on at least a subset of the multiplicity of smaller geo-fences until only the closest smaller geo-fence is located and used for a positioning calculation.

14. The system of claim 9, wherein the existing geo-fence of the number of complex polygonal geo-fences has a boundary corresponding to a self-intersecting polygonal shape.

15. A non-transitory computer program product for reducing central processor unit cycles of a mobile computing device by performing a number of positioning calculations in reference to any number of complex polygonal geo-fences at the time of each location update, the computer program product comprising a non-transitory computer-readable storage medium containing computer program code that when executed causes one or more processors to perform the steps of:
prior to distance calculations for use in a geo-fencing application, deconstructing an existing geo-fence of a number of complex polygonal geo-fences represented as geospatial data, by decomposing the existing geo-fence into a multiplicity of smaller geo-fences, each representing a portion of the existing geo-fence, the multiplicity of smaller geo-fences represented using a hierarchical data structure;
determining a position of the mobile computing device as a geo-hash reference;
traversing the hierarchical data structure to identify which smaller geo-fence of the multiplicity of smaller geo-fences that is closest to the determined position; and
determining for each location update a distance of the position of the mobile computing device to the identified closest smaller geo-fence.

16. The non-transitory computer program product of claim 15, wherein the computer program code when executed further causes the one or more processors to deconstruct each smaller geo-fence into a further number of yet smaller geo-fences when one of the smaller geo-fences intersects the boundary of the existing geo-fence, this step being repeated for each of the smaller geo-fences to a level of granularity that is sufficient to replace the existing geo-fence with a large number of smaller geo-fences whose combined shape mirrors that of the existing geo-fence.

17. The non-transitory computer program product of claim 15 wherein the computer program code when executed further causes the one or more processors to use spatial indexing to identify the geo-fence of the multiplicity of smaller geo-fences that is closest to the determined position.

18. The non-transitory computer program product of claim 15, wherein the computer program code when executed further causes the one or more processors to use predetermined data representative of the geospatial data representing the existing geo-fence to determine the multiplicity of smaller geo-fences that, when grouped, mirror the shape of the existing geo-fence, and apply principles of Quadtree data structures on at least a subset of the multiplicity of smaller geo-fences until only the closest smaller geo-fence is located and used for a positioning calculation.

* * * * *